United States Patent

Kubicek

[15] 3,661,473
[45] May 9, 1972

[54] EXTENSION TOOL HOLDER

[72] Inventor: Louis A. Kubicek, Ypsilanti, Mich.

[73] Assignee: Burr-Ban Tool Service Co., Detroit, Mich.

[22] Filed: Dec. 22, 1969

[21] Appl. No.: 887,060

[52] U.S. Cl. ..............................408/239, 408/228, 408/714
[51] Int. Cl. .........................................................B23b 51/16
[58] Field of Search...............77/73.5, 58 A; 145/114.5, 123, 145/124; 408/228, 239, 714

[56] References Cited

UNITED STATES PATENTS

| 1,536,208 | 5/1925 | Gosper | 145/124 |
| 3,230,798 | 1/1966 | Kubicek et al. | 77/73.5 |

Primary Examiner—Francis S. Husar
Attorney—Hauke, Gifford and Patalidis

[57] ABSTRACT

An extension tool holder having a cylindrical outer housing adapted to be inserted into a chuck of a rotary drive machine. A tool holding rod is axially slidably mounted in a bore formed in the housing for rotation about its axis of elongation. A coil spring disposed within the bore around the rod biases the rod into the bore. During the back-stroke of the machine chuck, in the deburring of holes the coil spring compresses due to the engagement of the cutting edge of the deburring tool and the edge of the hole being deburred, allowing the deburring tool to delay at the edge of the hole to adequately deburr the workpiece.

5 Claims, 4 Drawing Figures

PATENTED MAY 9 1972 3,661,473
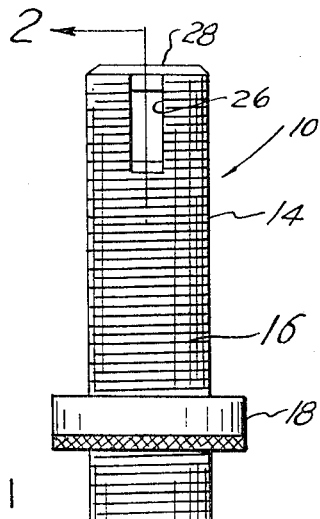
FIG. 1
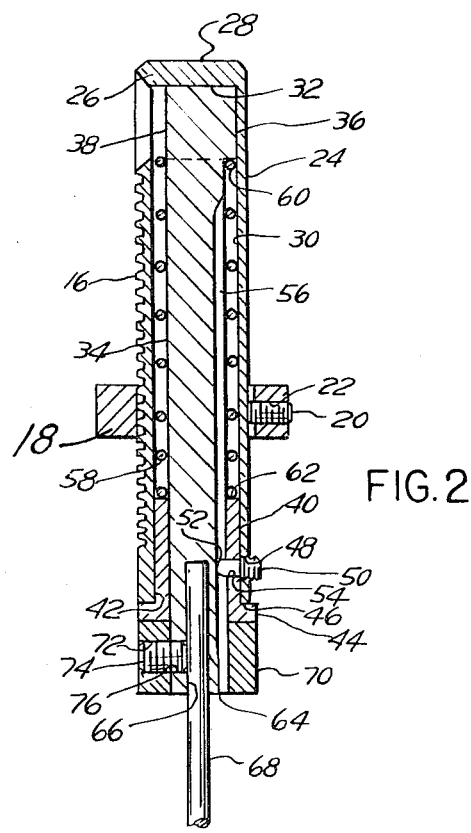
FIG. 2
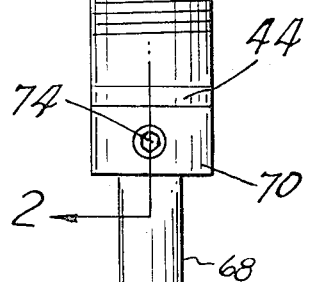
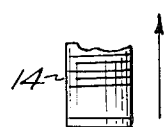
FIG. 4
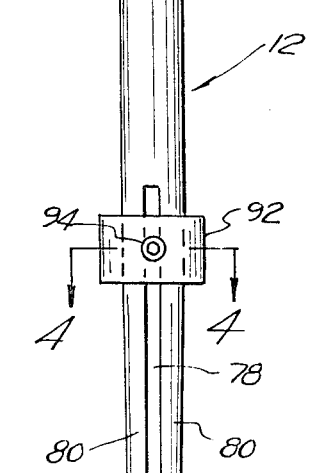
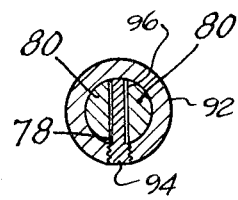
FIG. 3
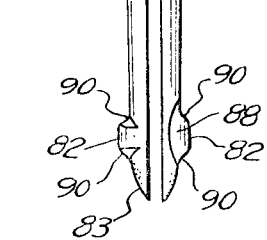
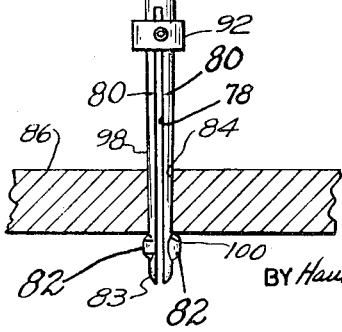
INVENTOR
LOUIS A. KUBICEK
BY Hauke, Gifford & Patalidis
ATTORNEYS

EXTENSION TOOL HOLDER

BACKGROUND OF THE INVENTION

1. Field of the Invention

The invention relates to tool holders and more particularly to an extension type tool holder.

2. Description of the Prior Art

In the drilling of holes in workpieces it is usually necessary to adjust the feed-in rate and the rotation rate depending upon the size of the drill being used. The back-stroke rate when drilling holes usually does not have to be adjusted, since the same back-stroke can be used for all sizes of drills. The older automated driving machines for drilling operations were constructed according to the above requirements by providing an adjustment for the feed-in rate and the rotation rate. The back-stroke rate on the older driving machines was usually not adjustable and was set reasonably high so as not to lose valuable time on the withdrawal of the drill from the workpiece.

It is often desirable to use these older driving machines in deburring the edges of the drilled holes. When using these machines with deburring tools of the type having a pair of parallel spaced arms with a radially extending lobe having a cutting edge formed thereon on each arm, it is necessary to adjust not only the feed-in and rotation rate, but also the back-stroke rate. The feed-in rate must be adjusted slow enough to allow the cutting edges to deburr the forward edge of the hole before the lobes and a portion of the arms are pushed through the drilled hole to deburr the rear edge of the hole. On the back-stroke, the cutting edges must remain in contact with the rear edge of the hole for a time sufficient to deburr the edge. The quick back-stroke of the older driving machines does not always provide sufficient time to accomplish the deburring on the inner surface of the workpiece.

SUMMARY OF THE INVENTION

The tool holder of the present invention permits the tool to be extended upon retraction to maintain the cutting edges of the deburring tool in contact with the rear edge of the hole for a time sufficient for the tool to deburr the edge. The tool includes a cylindrical outer housing for insertion into the chuck of a rotary driving machine for rotation about its axis of elongation. The outer housing includes a cylindrical bore formed therein parallel to the axis of elongation of the housing and closed at the end adjacent the end of the housing that is inserted into the chuck.

A tool holding rod having an end portion axially slidably mounted within the bore of the outer housing has an elongated slot formed on its inner end portion parallel to the axis of elongation of the rod. The outer housing includes a radially extending threaded aperture formed adjacent the bore opening for receiving a screw having a cylindrical projection formed on its inner end. The projection extends into the elongated slot of the rod to lock the rod to the housing so that the rod is rotated about its axis of elongation as the housing is rotated without inhibiting axial movement of the rod. The outer end of the rod is formed with a bore extending inwardly parallel to the axis of elongation of the rod for securing a deburring tool therein. A coil spring disposed within the bore around the rod biases the rod into the bore.

A deburring tool, preferably including a pair of parallel arms each having a radially extending cutting lobe formed thereon, is secured for rotation in the rod bore of the tool holder. As the holder and deburring tool are rotated by the driving machine, the deburring tool is moved into the hole in the workpiece to be deburred. The feed-in rate of the driving machine may be adjusted to insure that the cutting lobes engage the outer edge of the hole for a sufficient number of revolutions to deburr the edge. As the driving machine continues to move the deburring tool towards the workpiece, the arms are pushed together allowing the lobes and a portion of the arms to pass through the hole. On the back-stroke of the driving machine, the lobes engage the rear edge of the hole to be deburred. The force necessary to compress the arms to draw the lobes back through the hole, compresses the spring disposed within the bore allowing the lobes to remain engaged with the inner edge of the hole for a sufficient number of revolutions to completely deburr the workpiece. Thus, even if the driving machine does not have a back-stroke adjustment, the tool holder provides for a sufficient dwell on the inner edge of the hole to completely deburr the workpiece.

DESCRIPTION OF THE DRAWINGS

The description refers to the accompanying drawings wherein the reference numerals refer to like parts throughout the several views, and in which:

FIG. 1 is a side elevational view of a preferred embodiment of the present invention;

FIG. 2 is a cross-sectional view taken on line 2—2 of FIG. 1;

FIG. 3 is a side elevational view showing the deburring tool being withdrawn from the workpiece; and FIG. 4 is a cross-sectional view taken on line 4—4 of FIG. 1 showing the adjustment mechanism.

DESCRIPTION OF THE PREFERRED EMBODIMENT

Referring to FIG. 1, a deburring tool extension holder, generally indicated at 10, is adapted to carry a deburring tool, generally indicated at 12, such that the deburring tool holder 10 and the tool 12 are rotated about their axes of elongation by the chuck of a suitable rotary drive machine (not shown).

The tool holder 10, as shown in FIGS. 1 and 2, includes an outer cylindrical housing 14 which has threads 16 formed along its outer surface for receiving an adjustment collar 18 screwed thereon. The adjustment collar 18 is provided with a set screw 20 threaded into an aperture 22 (FIG. 2) formed therein for axially positioning the collar along the housing 14. When the housing 14 is inserted into the chuck of the driving machine, the collar 18 engages the front surface of the chuck to axially position the housing 14 in the chuck.

A portion of the threads 16 are ground away to provide a flat surface 24 (FIG. 2) which receives a set screw (not shown) carried by the chuck of the driving machine to secure the outer housing 14 in the chuck. A Woodruff key slot 26 is formed in the housing 14 adjacent the rear end 28. The slot 26 receives a Woodruff key (not shown) carried by the machine chuck for rotatably driving the outer housing 14 about its axis of elongation.

As can best be seen in FIG. 2 the outer housing 14 is formed with a central bore 30 extending parallel to the axis of elongation of the outer housing and having a closed inner end formed by surface 32. A tool holding rod 34 having an end portion slidably mounted within the bore 30 is formed with a cylindrical inner end 36 of larger diameter than the remaining portion of the rod 34. The inner end 36 is formed with a flat portion 38 ground thereon so as not to interfere with the Woodruff key inserted into the key slot 26. The cylindrical inner end 36 forms a bearing surface between the rod 34 and the bore 30, allowing the rod 34 to slide axially within the bore 30.

A cylindrical collet 40 slidably mounted around the rod 34 and formed with a slightly smaller outer diameter than the bore 30 is positioned within the bore 30 adjacent the bore opening 42 for providing a second bearing surface for the rod 34. The collet 40 includes an annular flange 44 which extends outwardly from the outer end of the collet so as to engage the front surface 46 of the housing 14, aiding in the positioning of the collet within the bore 30.

The housing 14 is formed with a radially extending threaded aperture 48 formed therein adjacent the bore opening 42 for receiving a screw 50 formed with a cylindrical projection 52 on its inner end. The projection 52 extends through an aperture 54 formed in the collet 40, securing the collet 40 against axial or rotary movement relative to the housing 14. The rod 34 is formed with an elongated slot 56 formed therein substantially parallel to the axis of elongation of the rod 34 for receiving the end of the projection 52. Thus, as the housing 14 is rotated by the machine chuck, the projection 52 engaging the slot 56 of the rod 34 rotates the rod about its axis of elongation. Due to the slot 56, the projection 52 does not prevent the rod 34 from sliding axially within the bore 30.

A coil spring 58 disposed around the smaller diameter portion of the rod 34 within the bore 30 is compressed between an annular surface 60 formed on the end 36 and an annular surface 62 formed on the collet 40, thus urging the rod 34 into the bore 30.

Still referring to FIG. 2, the outer end 64 of the rod 34 is formed with a cylindrical bore 66 extending inwardly therefrom parallel to the axis of elongation of the rod 34 for receiving the shank 68 of the deburring tool 12. A collet 70, positioned around the outer end of the rod 34, includes a radially extending threaded opening 72 formed therein for receiving a set screw 74. The rod 34 includes a radially extending aperture 76 formed in its outer end and intersecting the bore 66. The aperture 76 registers with the threaded opening 72 for receiving the set screw 74 which secures the shank 68 of the deburring tool 12 in the bore 66.

The deburring tool 12, as illustrated in FIGS. 1 and 3, and as shown and described in more detail in my U.S. Pat. No. 3,230,798 issued Jan. 25, 1966, is preferably formed with a longitudinally extending tension slot 78 forming a pair of substantially parallel and symmetrical support columns 80. Substantially arcuate cutting ridges or lobes 82 are preferably formed on the periphery of each of the support columns 82. The cutting ridges 82 are spaced axially somewhat from the free ends of the support columns 80 to form a pilot portion 83 to aid in the insertion of the deburring tool 12 into the hole 84 (FIG. 3) of the workpiece 86 to be deburred. The cutting ridges 82 are provided with substantially radially extending flat surface portions 88. (FIG. 1) These are disposed in substantially parallel planes on opposite sides of the deburring tool 12 and provide sharp cutting edges 90 at each side of the ridges 82.

A collar 92 is slidably mounted around the support columns 80 and is retained in position by means of a set screw 94 integrally carrying a pin 96 disposed to extend inwardly into the tension slot 78, as is shown in FIG. 4. When the set screw 94 is tightened against the outer surface of the support columns 80, the pin 96 provides a fulcrum for the support columns 80 at the point of adjustment so that the adjustment and flexibility of the support columns will depend upon the longitudinal position of the collar 92.

In operation, the shank 68 of the deburring tool 12 is secured in the rod bore 66 by set screw 74. The adjustment collar 18 is then positioned on the housing 14, setting the distance the housing 14 and the tool 12 will extend from the machine chuck. A Woodruff key is then inserted into the slot 26 and the rear portion of the housing 14 is inserted into the machine chuck with the face of the chuck flush with the collar 18. The housing 14 is secured therein by turning a set screw against the surface 24. As positioned, the holder 10 and the tool 12 are rotated about their axes of elongation by the chuck of the rotary drive machine.

The feed-in rate and the rotation speed of the driving machine are then adjusted for the deburring operation. Referring to FIG. 3, as the deburring tool 12 is advanced toward the hole 84 to be deburred, the pilot portion 83 enters the hole 84. As the bottom cutting edges 90 of the ridges 82 engage the upper edge 98 of the hole 84, the rotary motion of the tool 12 deburrs the edge 98. The feed-in rate of the driving machine has been previously set to insure that the tool 12 turns a sufficient number of revolutions while the cutting edges 90 are engaged with the edge 98 to adequately deburr the edge.

As the tool 12 continues to advance the arms 80 are pushed together by the engagement of the ridges 82 and the hole 84, allowing the ridges 82 and a portion of the arms 80 to pass through the hole 84 to deburr the bottom edge 100 of the hole 84. When the ridges 82 have cleared the hole 84, the arms 80 spring back to their original position, as indicated in FIG. 3, ready to deburr the back edge 100 on the back-stroke of the driving machine.

On the back-stroke of the driving machine, the top cutting edges 90 of the ridges 82 engage the edge 100 to deburr the edge. In order to pull the tool 12 back through the hole 84, the force on the tool 12 must be sufficient to push the arms 80 together, allowing the ridges 82 to pass through the hole 84. Thus, on the back-stroke of the driving machine, the cutting edges 90 remain in contact with the edge 100, pulling the tool 12 and the collet 70 away from the housing 14, as shown in FIG. 3. As the tool 12 and the collet 70 are pulled away from the housing 14, the rod 34 is also pulled axially out of the bore 30. The rod 34 slides along the bearing surface formed between the inner end 36 and the bore 30 and the bearing surface formed between the rod 34 and the collet 40. As the rod 34 is pulled out of the bore 30, the inner end of the projection 52 slides along in the slot 56 formed in the rod 34, thus, not inhibiting the rod from being pulled out of the bore 30. As the housing 14 is rotated by the machine chuck, the screw 50 is turned, rotating the rod 34 about its axis by the engagement of the projection 52 and the slot 56. As the rod 34 is withdrawn from the bore 30, the coil spring 58 is compressed between the inner end 36 of the rod 34 and the surface 62 of the collet 40. The compression of the spring 58 on the back-stroke of the machine chuck causes the spring to exert a greater force on the rod 34 tending to pull the rod into the bore 30. This greater force is transmitted to the tool 12 tending to push the arms 80 together and pull the ridges 82 through the hole 84. When the spring 58 has been compressed to the extent that the force of the spring is strong enough to push the arms 80 together, the arms 80 are pushed together and the ridges 82 are pulled through the hole 84, pulling the rod 34 back into the bore 30.

As the spring 58 is being compressed on the back-stroke of the machine chuck, the tool 12 continues rotating with the cutting edges 90 engaged with the back edge 100 of the hole 84. Thus, as the spring 58 is being compressed, the tool 12 continues to deburr the back edge of the hole 84. Therefore, if the back-stroke of the driving machine is very quick and is non-adjustable, the tool holder 10 with the spring 58 allows the cutting edges 90 to remain in contact with the edge 100 for a sufficient number of revolutions to deburr the edge. Thus, the tool holder 10 provides the dwell necessary on the back-stroke of the driving machine.

It is to be noted that by varying the strength of the spring 58, the back-stroke dwell provided by the tool holder 10 is varied, thus varying the amount of deburring that takes place. Furthermore, by varying the position of the collar 92 the force required to push the arms 80 together is varied, thus, varying the back-stroke dwell provided by the tool holder 10.

Although the deburring tool 12 is illustrated with two substantially parallel arms 80 and a cutting ridge 82 on each arm with radially extending cutting edges 90, it is to be understood that the tool may be replaced by a cutting tool having two arms and a cutting ridge on only one of the arms, as is generally illustrated in my U.S. Pat. No. 3,276,294. Alternatively, the radially extending cutting ridges 90 may be replaced with a cutting edge along the top of the cutting ridge 82 extending generally parallel to the axis of elongation of the tool for deburring inside a hole. Although the tool 12 is illustrated with an adjustment collar 92, it is to be understood that a different mechanism may be used to adjust the tension of the two arms 80, such as a transversely extending pin between the slot 78, as is illustrated in my U.S. Pat. No. 3,411,386.

I claim:

1. The combination of an extension tool holder and a deburring tool comprising:
   a cylindrical housing having a bore formed therein,
   deburring tool means having a portion extending from within said bore to a point axially spaced from said housing,
   a tool holding rod connected to said deburring tool means and having an exterior surface and an axially extending elongated slot formed in said exterior surface,
   means carried by said housing and limiting outward and inward axial movement of said deburring tool means, a pin carried by said housing and extending into said slot whereby rotation of said housing also produces rotation of said deburring tool means but said pin and slot permit said deburring tool means to move axially with respect to said housing, and a spring carried in said bore and urging said deburring tool means axially inwardly to the limit permitted by said limiting means.

2. The combination as defined in claim 1 and in which said deburring tool means comprises a first portion normally disposed within said housing, a second portion having cutting means at one end thereof and means for axially coupling the tool holding rod portion to said first portion.

3. The combination as defined in claim 2 and in which said second portion comprises a pair of spaced apart arms and including means carried by said second portion for varying the effective length of said arms.

4. The combination as defined in claim 3, wherein said last mentioned means includes a collar adjustably longitudinally slidably mounted around said arms, and means carried by said collar and extending between said arms for providing a fulcrum between said arms which varies the effective length of said arms.

5. The combination as defined in claim 1 and in which said limiting means comprises a cylindrical collet extending into said bore and means for securing said collet to said housing, said tool holding rod being positioned within said bore and engaging with the end of said collet to thereby limit outward movement of said deburring tool means and the end of said housing opposite said deburring means being closed to limit inward axial movement of said deburring tool means.

* * * * *

UNITED STATES PATENT OFFICE
CERTIFICATE OF CORRECTION

Patent No. 3,661,473    Dated May 9, 1972

Inventor(s) Louis A. Kubicek

It is certified that error appears in the above-identified patent and that said Letters Patent are hereby corrected as shown below:

Column 5, line 13, after "rod" delete "portion".

Signed and sealed this 26th day of September 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,661,473　　　　　　　Dated May 9, 1972

Inventor(s) Louis A. Kubicek

It is certified that error appears in the above-identified patent and that said Letters Patent are hereby corrected as shown below:

Column 3, line 26, after "columns" delete "82" and insert --80--.

Column 5, line 13, after "rod" delete "portion".

Signed and sealed this 2nd day of January 1973.

(SEAL)
Attest:

EDWARD M. FLETCHER, JR.　　　　　　　　ROBERT GOTTSCHALK
Attesting Officer　　　　　　　　　　　Commissioner of Patents